(12) United States Patent
Forehand

(10) Patent No.: US 7,134,238 B2
(45) Date of Patent: Nov. 14, 2006

(54) APPARATUS FOR KILLING INSECTS BY TRAPPING LARVAE

(76) Inventor: James Daniel Forehand, 42 Parkstone Ct., Stone Mountain, GA (US) 30087

( * ) Notice: Subject to any disclaimer, the term of this patent is extended or adjusted under 35 U.S.C. 154(b) by 0 days.

(21) Appl. No.: 11/083,661

(22) Filed: Mar. 18, 2005

(65) Prior Publication Data

US 2005/0160659 A1    Jul. 28, 2005

Related U.S. Application Data

(63) Continuation-in-part of application No. 09/998,148, filed on Nov. 30, 2001, now Pat. No. 7,012,653.

(51) Int. Cl.
*A01M 1/10* (2006.01)
*A01M 1/20* (2006.01)

(52) U.S. Cl. .......................... 43/122; 43/107

(58) Field of Classification Search ................. 43/107, 43/122, 121, 132.1, 133
See application file for complete search history.

(56) References Cited

U.S. PATENT DOCUMENTS

| | | | | |
|---|---|---|---|---|
| 407,889 A * | 7/1889 | Davis | ........................... | 43/121 |
| 794,637 A | 7/1905 | Park et al. | ........................... | 43/131 |
| 1,005,530 A * | 10/1911 | Fritsch | ........................... | 43/107 |
| 1,085,329 A * | 1/1914 | Gabel | ........................... | 43/122 |
| 1,387,716 A * | 8/1921 | Hofley | ........................... | 43/122 |
| 1,577,351 A | 3/1926 | Alvarez | ........................... | 43/131 |
| 1,623,439 A * | 4/1927 | Rawlings | ........................... | 43/107 |
| 1,714,666 A | 5/1929 | Gring | ........................... | 43/131 |
| 1,787,421 A * | 12/1930 | Ruddell | ........................... | 43/107 |
| 1,831,476 A | 11/1931 | Bennett | ........................... | 222/54 |
| 1,919,916 A * | 7/1933 | Taylor | ........................... | 43/107 |
| 1,936,644 A | 11/1933 | Schroder | ........................... | 43/121 |
| 1,968,954 A * | 8/1934 | Metzger | ........................... | 43/107 |
| 1,974,549 A | 9/1934 | Spencer et al. | ........................... | 119/6.5 |
| 2,109,642 A | 3/1938 | Hunt | ........................... | 43/124 |
| 2,254,948 A | 9/1941 | Kubalek | ........................... | 43/131 |
| 2,424,421 A * | 7/1947 | Temme | ........................... | 43/121 |
| 2,539,633 A | 1/1951 | Morrill | ........................... | 119/6.5 |
| 2,970,565 A | 2/1961 | Reynolds | ........................... | 119/6.5 |
| 3,224,145 A | 12/1965 | Ballard | ........................... | 47/81 |
| 3,590,119 A | 6/1971 | Cardarelli et al. | ........................... | 424/409 |
| 3,643,371 A | 2/1972 | Gordon | ........................... | 43/131 |

(Continued)

FOREIGN PATENT DOCUMENTS

FR    2 505 140    11/1982

(Continued)

*Primary Examiner*—Kurt Rowan
(74) *Attorney, Agent, or Firm*—Rodgers & Rodgers

(57) ABSTRACT

An apparatus provides for the killing of insects by trapping the larvae. In one preferred embodiment, the apparatus includes a container with a protrusion and a second non-horizontal surface, such as a funnel, positioned above the protrusion. The funnel defines an opening above the protrusion. A barrier may also be included that abuts the underside of the funnel. A liquid is placed in the container at a level at least above the opening such that eggs laid in the water become larvae that swim downward and are directed through the opening by the funnel and are directed away from the opening by the protrusion. The larvae either drown or become trapped adult mosquitoes. It is noted that this abstract is provided to comply with the rules requiring an abstract that allows a searcher or reader to ascertain quickly the subject matter of the technical disclosure and is submitted with the understanding that it will not be used to interpret or limit the scope or meaning of the claims.

17 Claims, 13 Drawing Sheets

U.S. PATENT DOCUMENTS

| | | | |
|---|---|---|---|
| 3,997,999 A | 12/1976 | Evans | 43/107 |
| 4,002,146 A | 1/1977 | Neff | 119/51.04 |
| 4,103,450 A | 8/1978 | Whitcomb | 43/131 |
| 4,218,843 A | 8/1980 | Clarke, Jr. | 43/131 |
| 4,282,673 A | 8/1981 | Focks et al. | 43/113 |
| 4,283,878 A | 8/1981 | Hill et al. | 43/114 |
| 4,310,985 A | 1/1982 | Foster et al. | 43/131 |
| 4,328,636 A | 5/1982 | Johnson | 43/107 |
| 4,631,857 A | 12/1986 | Kase et al. | 43/132.1 |
| 4,638,592 A * | 1/1987 | Schneidmiller | 43/122 |
| 4,794,724 A | 1/1989 | Peters | 43/112 |
| 4,908,977 A | 3/1990 | Foster | 43/107 |
| 5,123,201 A | 6/1992 | Reiter | |
| 5,359,808 A | 11/1994 | Fitsakis | 43/132.1 |
| 5,452,540 A * | 9/1995 | Dowd et al. | 43/107 |
| 5,695,776 A | 12/1997 | Ballard et al. | 424/408 |
| 5,731,055 A | 3/1998 | Bernardo | 428/76 |
| 5,749,168 A | 5/1998 | Chrysanthis | 43/122 |
| 5,771,628 A | 6/1998 | Nobbs | 43/121 |
| 5,775,261 A | 7/1998 | Shaw | 119/482 |
| 5,799,436 A | 9/1998 | Nolen et al. | 43/112 |
| 5,815,980 A | 10/1998 | Clarke, Jr. | 43/113 |
| 5,819,685 A | 10/1998 | Kappelt et al. | 119/6.5 |
| 5,896,697 A | 4/1999 | Kang | 43/133 |
| 5,979,108 A | 11/1999 | Adams | 43/121 |
| 5,983,557 A | 11/1999 | Perich et al. | 43/107 |
| 6,077,521 A | 6/2000 | Hammond et al. | 424/405 |
| 6,088,949 A | 7/2000 | Nicosia et al. | 43/107 |
| 6,112,453 A | 9/2000 | Clarke, Jr. | 43/113 |
| 6,143,313 A | 11/2000 | Ito et al. | |
| 6,185,861 B1 | 2/2001 | Perich et al. | 43/107 |
| 6,209,256 B1 | 4/2001 | Brittin et al. | 43/107 |
| 6,286,249 B1 | 9/2001 | Miller et al. | 43/139 |
| 6,305,122 B1 | 10/2001 | Iwao et al. | 43/112 |
| 6,389,740 B1 | 5/2002 | Perich et al. | 43/131 |
| 6,391,329 B1 | 5/2002 | Ito et al. | 424/409 |
| 6,481,152 B1 | 11/2002 | Gray | 43/113 |
| D468,389 S | 1/2003 | Israel et al. | D22/122 |
| 6,502,347 B1 | 1/2003 | Carver, Sr. | 43/113 |
| 6,516,559 B1 | 2/2003 | Simchoni et al. | 43/114 |
| 6,530,172 B1 | 3/2003 | Lenz | 43/112 |
| D472,601 S | 4/2003 | Israel et al. | D22/122 |
| 6,568,124 B1 | 5/2003 | Wilbanks | 43/112 |
| 6,591,545 B1 | 7/2003 | Brunet | 43/112 |
| 6,594,946 B1 | 7/2003 | Nolen et al. | 43/114 |
| 6,637,149 B1 * | 10/2003 | Bauer | 43/107 |

FOREIGN PATENT DOCUMENTS

WO     WO 00/74475 A1     12/2000

* cited by examiner

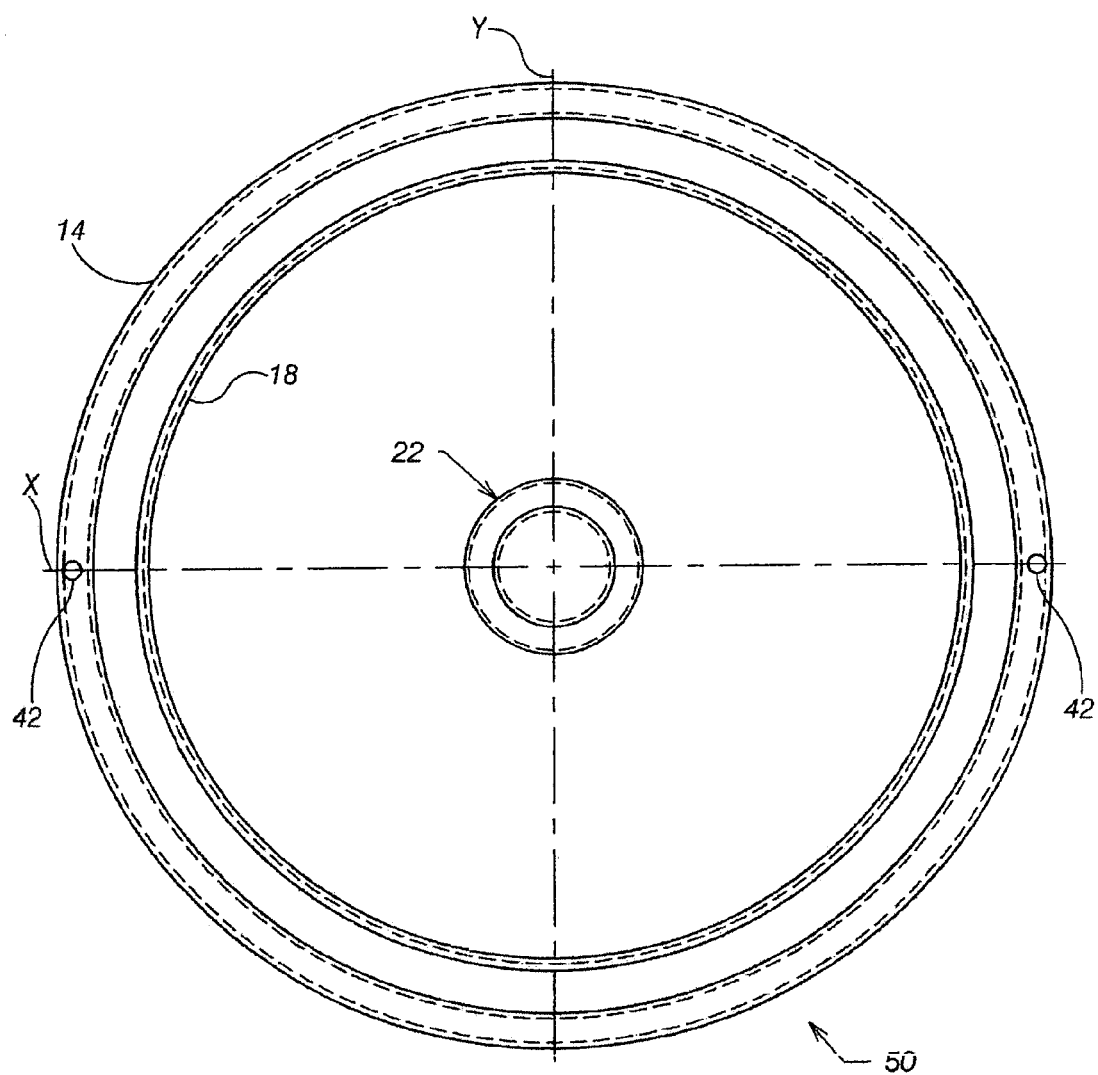
FIG. 1.1

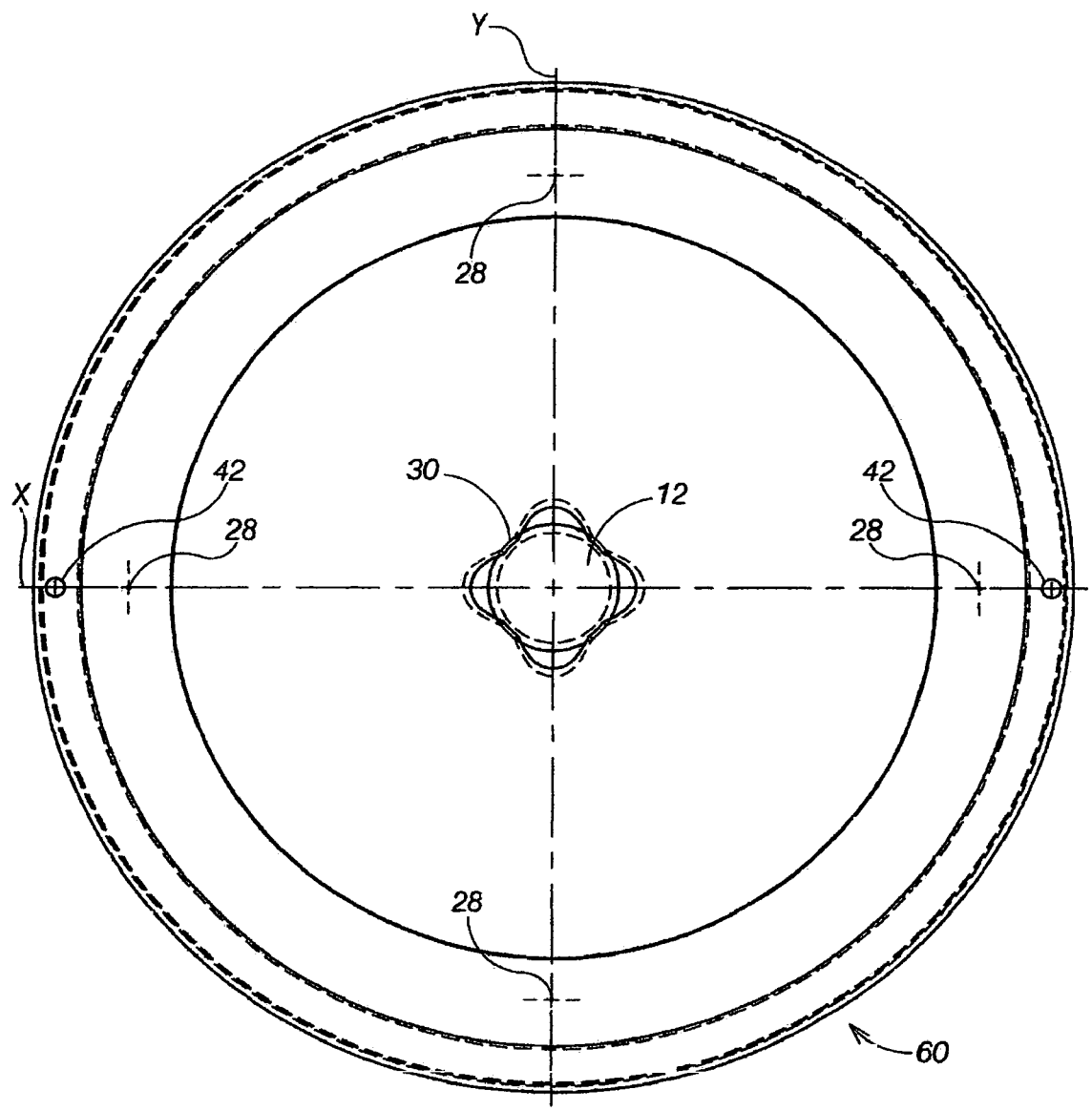
FIG. 2.1

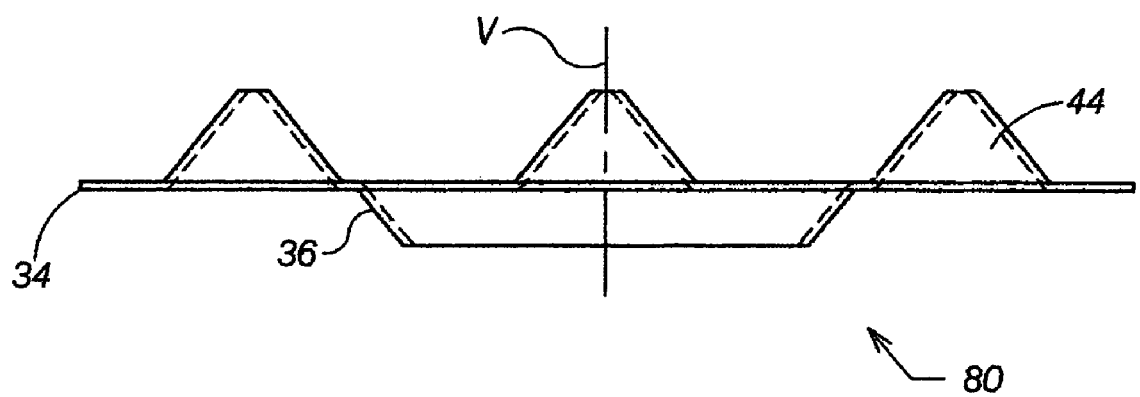
FIG. 3.1

FIG. 5.1

APPARATUS FOR KILLING INSECTS BY TRAPPING LARVAE

RELATED APPLICATIONS

This application is a Continuation In Part of U.S. patent application Ser. No. 09/998,148 filed on Nov. 30, 2001 now U.S. Pat. No. 7,012,653 and entitled METHOD AND APPARATUS FOR KILLING INSECTS BY TRAPPING LARVAE, which claims priority to U.S. Provisional Application No. 60/413,963 filed on Sep. 26, 2002 and entitled MOSQUITO LARVA TRAP, both of which are incorporated herein in its entirety.

TECHNICAL FIELD

This invention relates in general to insect control, and in particular to the capture and killing of insects such as mosquito larvae before they become adult biting mosquitoes.

BACKGROUND

Mosquitoes are more than just an annoying problem. From the 1800s when British Army Doctor Donald Ross proved malaria was transmitted by mosquitoes, to the present United States outbreak of the mosquito borne West Nile virus, mosquitoes have proven to be a serious problem for both man and animals. Some other diseases transmitted by mosquitoes are dengue, yellow fever, and encephalitis varieties such as Eastern Equine encephalitis, Western Equine encephalitis, La Crosse encephalitis, St. Louis encephalitis, and Japanese encephalitis.

The quest to prevent mosquito transmitted diseases and the general annoyance of being bitten while engaged in outdoor activities has been long and generally unsuccessful. Primary methods of control have been directed at large scale sprayings of indiscriminate poisonous chemicals, attractant traps directed at killing adult mosquitoes, draining of breeding areas such as wetlands, or the application of larvicide chemicals in bodies of water.

Many poisonous chemicals not only kill mosquitoes, but also destroy beneficial insects as well as having detrimental effects on other wildlife such as birds. DDT is still a cause of ecological damage after over thirty years of non-use in the United States. Draining of wetlands has been recognized as destructive to the overall health of our environment and the use of larvicide chemicals in these areas is expensive, requires repeated applications during the breeding season, and could have long term side effects as yet undetermined. Various types of traps have been introduced that attract adult mosquitoes by the use of light, emissions of chemical attractants, carbon dioxide releases, and even vibrating membranes that mimic animal skin. The killing mechanisms used by these traps tend to be electrocuting devices, vacuuming insects into holding bags, introducing the insects to poisonous chemicals, or providing a sticky surface on which the insects become trapped. Many of these traps are expensive to produce and require extensive maintenance for their operation.

All of the above trapping methods result in the unintended destruction of beneficial insects. Current studies indicate existing commercially available traps such as the light attractant and carbon dioxide emitting varieties tend to attract disproportionately greater numbers of mosquitoes to an area than they actually kill. This action creates a negative impact on the intended result of mosquito elimination from a particular location. It has also been shown that the ratio of beneficial insects killed versus mosquitoes by many of these devices is sufficiently high that quite a few of these traps are actually regressive to the environment.

Mosquito populations grow exponentially with one adult female laying from a few to over one hundred eggs every third day of her breeding life. Obviously, the attracting and killing of individual mosquitoes using existing art is, at best, a check-stop measure as the existing art fails to kill mosquitoes in large numbers and break the cycle that allows the exponential growth of the population.

SUMMARY

Embodiments of the present invention address these issues and others by providing an apparatus that captures mosquito larvae to prevent them from developing into adult mosquitoes that are otherwise free to continue to reproduce and cause harm. Embodiments provide an attractive location for mosquitoes and other harmful insects to lay eggs while trapping and killing the larvae developing from these eggs and/or trapping and killing adult mosquitoes that have developed from the trapped larvae.

One embodiment is an apparatus for killing insects. One preferred design of the apparatus includes a container and a protrusion within the container, in which at least a portion of the protrusion is preferably sloped relative to the bottom. The apparatus also includes a directing member within the container that is positioned above the protrusion and having at least a portion that is non-horizontal. The directing member defines an opening that is located above the protrusion. The protrusion, directing member, and container define a chamber that for containing insect larvae and prevent those larvae from maturing into insects or, if they mature, from exiting the container.

Another preferred embodiment of the present invention includes a container and a bottom conical member within the container. A funnel-shaped member is located within the container above bottom conical member and defines an opening above the inverted cone. The embodiment further includes a barrier that has a first edge that abuts the underside of the funnel-shaped member and has a second edge that abuts the container. At least the barrier, the funnel-shaped member, and the container define a chamber.

Another embodiment of the present invention includes a container with a top, bottom, and sidewall. The bottom may include a protrusion. A funnel is positioned within the container and defines an opening above the floor. In further embodiments, the funnel may define a plurality of openings surrounding a center conical member adjacent to the protrusion. The container may be translucent while the directing member may be opaque such that the larvae are drawn away from the opening and further into the chamber toward the sidewall regardless of whether the bottom is sloped or flat.

DESCRIPTION OF THE DRAWINGS

FIG. 1.1 is a top plan or birds-eye view of the container of FIG. 1 showing center alignment of the protrusion.

FIG. 2.1 is a top plan view of the funneling device of FIG. 2 showing center alignment of its lower openings.

FIG. 3.1 is a front view of the ascension barrier of FIG. 3.

FIG. 5.1 is a cut away cross-sectional view of an illustrative snap-on lid portion of the funnel of FIG. 2 connected to the container of FIG. 1.

DETAILED DESCRIPTION

The present invention is more particularly described in the following examples that are intended as illustrative only since numerous modifications and variations therein will be apparent to those skilled in the art. As used in the specification and in the claims, "a," "an," or "the" can mean one or more, depending upon the context in which it is used. The preferred embodiment is now described with reference to the figures, in which like numbers indicate like parts throughout the figures.

The present invention provides a trap for insect larvae, in particular mosquito larvae, and a method of using such a trap. The larvae are contained so that they either drown or develop into adult mosquitoes that are unable to exit and eventually starve, depending upon the particular embodiment of the present invention and the corresponding level of liquid being used. The present invention, accordingly, assists in breaking the cycle of the exponential increase in mosquito populations.

Figure 1:
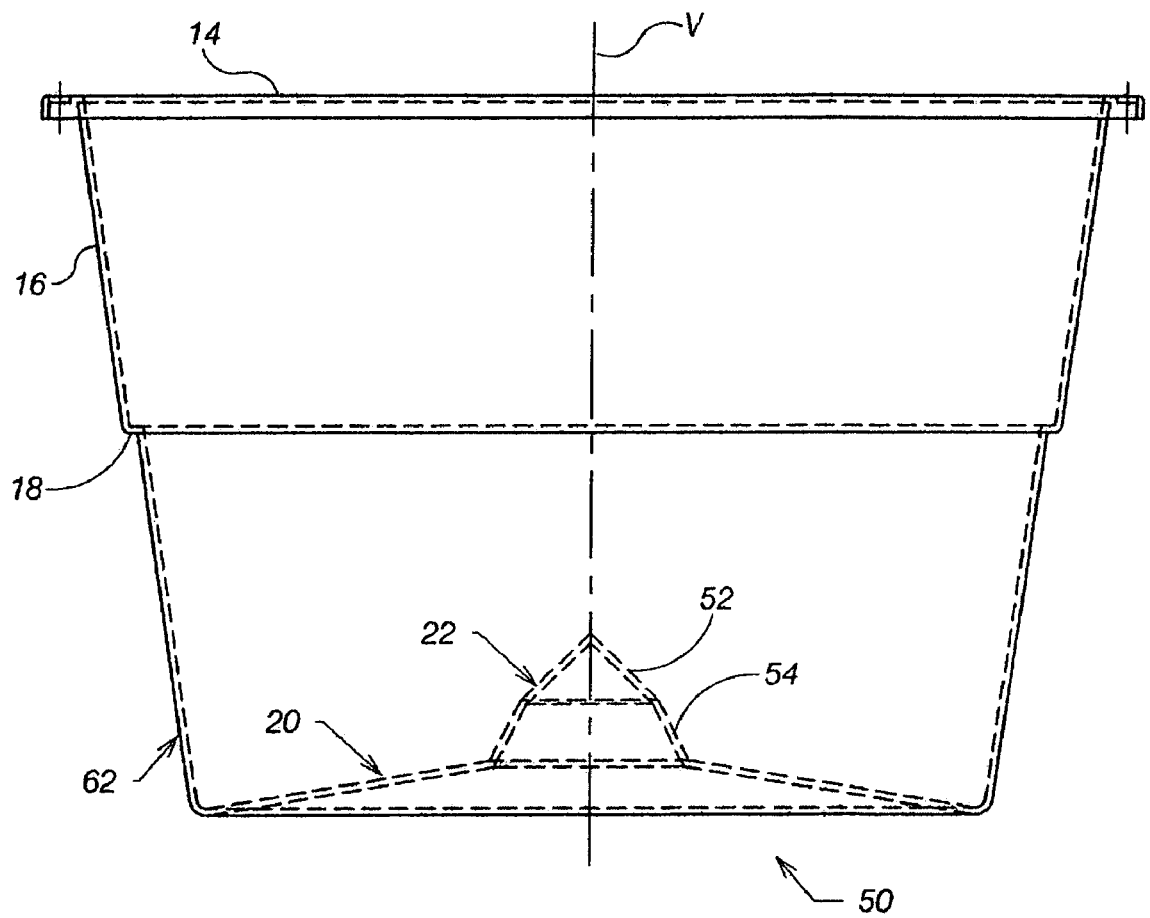
FIG. 1 is a front view of an illustrative container of one embodiment showing a concave bottom and a protrusion centered on the container bottom.

One preferred embodiment of the present invention comprises a container, a protrusion or inverted cone member, a directing member or funnel, and, optionally, a barrier. FIG. 1 is a front view of an exemplary container 50 according to one embodiment, in which a vertical axis V bisects the center of the container 50 and is used for reference throughout the drawings. In this embodiment, the container 50 is shown as being round in shape, but other shapes including polygons of various numbers of sides are also applicable. The container 50 may be made from various materials such as plastic or metal. However, translucent plastic allows the inside of the container 50 to be viewed by an observer to verify the functioning of the apparatus and also allows light to enter the container to further draw the larvae toward the light, as discussed below.

The container 50 includes various attributes. A sidewall 62 of the container 50 may optionally include a ledge 18 for an optional ascension barrier, discussed below, to rest on with the ledge 18 so as to separate an upper sidewall region 16 from the remainder of the sidewall 62. In this embodiment, a bottom surface 20 of the container 50 is concave to have a slight inward taper or slope forming a raised base.

Still referring to FIG. 1, a modified conical structure 22, which is an inverted cone, is positioned on the apex of the bottom 20. The conical structure 22 of this embodiment has a first sloped region 52 and second sloped region 54, with the top sloped region 52 having less slope. The taper of the bottom surface 20 of the container 50 has an even lesser slope extending between the conical structure 22 and the sidewall 62. As one skilled in the art will appreciate, if an object falls or drifts into the center of the container bottom 20, the conical structure 22 and concave design of the bottom direct that object toward the sidewall 62 of the container 20. Other manners of obtaining this same effect with the bottom 20 is to have a parabolic cross-section between the sidewall 62 and center or to have a consistent slope extending from the apex to the sidewall 62. As discussed below in relation to FIG. 9, other formations for the bottom of the container are applicable as well, such as having a substantially planar bottom of the container that is either flat or sloped relative to the horizontal and spans the diameter of the round bottom of the container 50. FIG. 1.1 is a top plan view of the container 50 depicting a 'y' axis Y and the perpendicular 'x' axis X in center alignment along with the top rim 14, which is also shown in FIG. 1. The optional ledge 18 is also shown, on which the optional ascension barrier may rest. The modified conical structure 22 of this particular embodiment is also shown. Optional holes 42 allow a simple bent wire handle (not shown) to be connected to the container 50 to facilitate carrying it.

Figure 2:
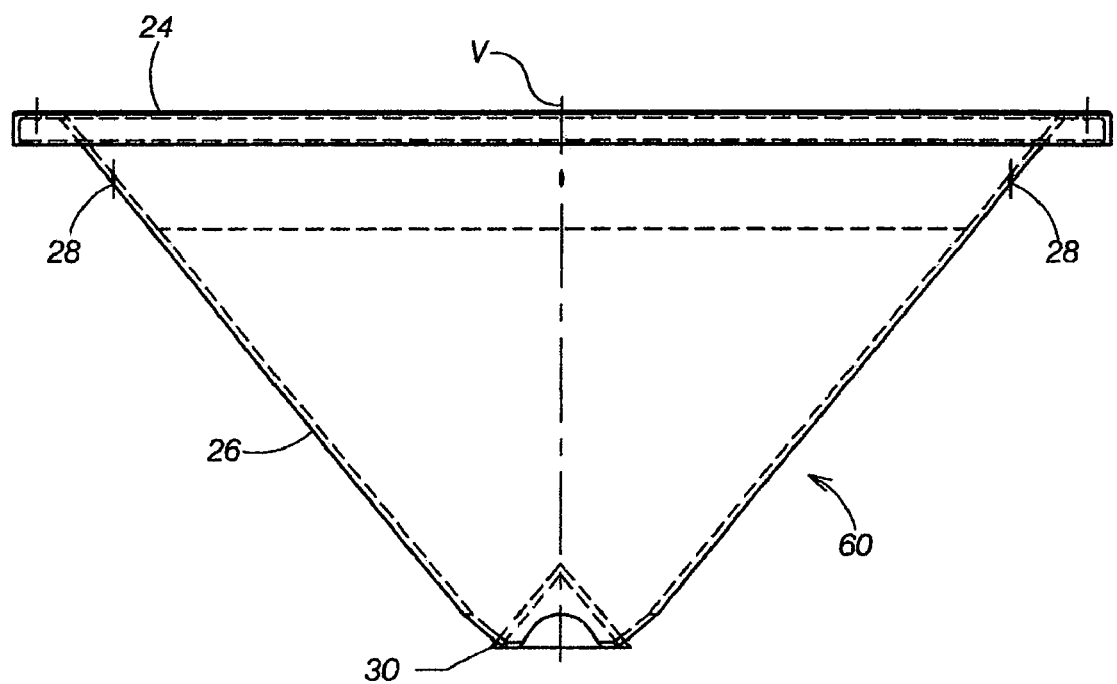
FIG. 2 is a front view of an illustrative funneling device of one embodiment that fits into the container of FIG. 1.
Figure 5:
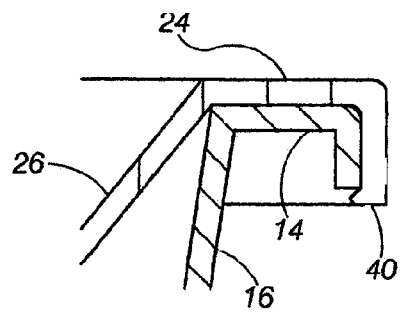
FIG. 5 is a front cross-sectional view of the assembled embodiment shown in FIG. 4.
Figure 5:
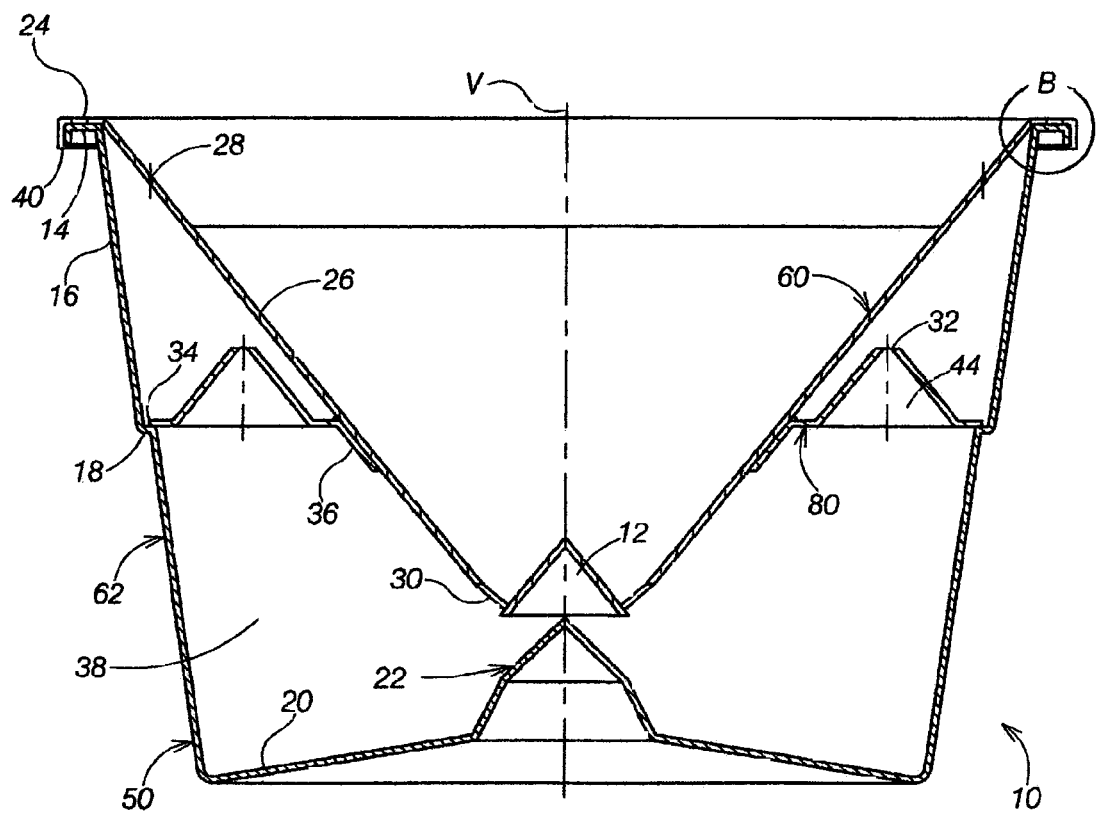

The present invention also preferably comprises a non-horizontal top surface to assist in directing or guiding larvae downwardly, and FIG. 2 shows a funnel 60 that is one exemplary embodiment. The funnel mounts within the container 50 and has a funnel sidewall 26, funnel top opening rim 24, center member 12, funnel bottom openings 30, and optional funnel vent holes 28, which allow air trapped during the filling process to escape when the apparatus is filled with liquid after being assembled. Such vent holes 28 are not necessary when ventilation is not required, such as when the container 50 is filled with liquid prior to the additional components such as funnel 60 being inserted into the interior of the container 50. The top opening rim 24 preferably attaches onto the top rim 14 of the container 50 by interlocking together, which is shown in FIG. 5.1.

As discussed in more detail below, the sloped sidewall 26 of the funnel 60 directs larvae to the bottom of the funnel where funnel sidewall 26 abuts or transitions to center member 12. One or more openings 30 at the junction of funnel sidewall 26 and center member 12 allow sinking or downwardly moving larvae to pass through from the funnel to the bottom surface 20, where they are directed toward the sidewall 62 of the container 50 and away from the openings 30. Thus, the slope of the sidewall 26 of the funnel 60 directs the larvae to an opening, and then once through, the slope of the bottom surface directs the larvae away from the opening to decrease the likelihood of reentry into the interior of the funnel 60. As discussed above, the conical structure 22 further assists in directing the larvae to the sidewall of the container and impedes the larvae from reentering into the interior of the funnel 60.

Figure 6:
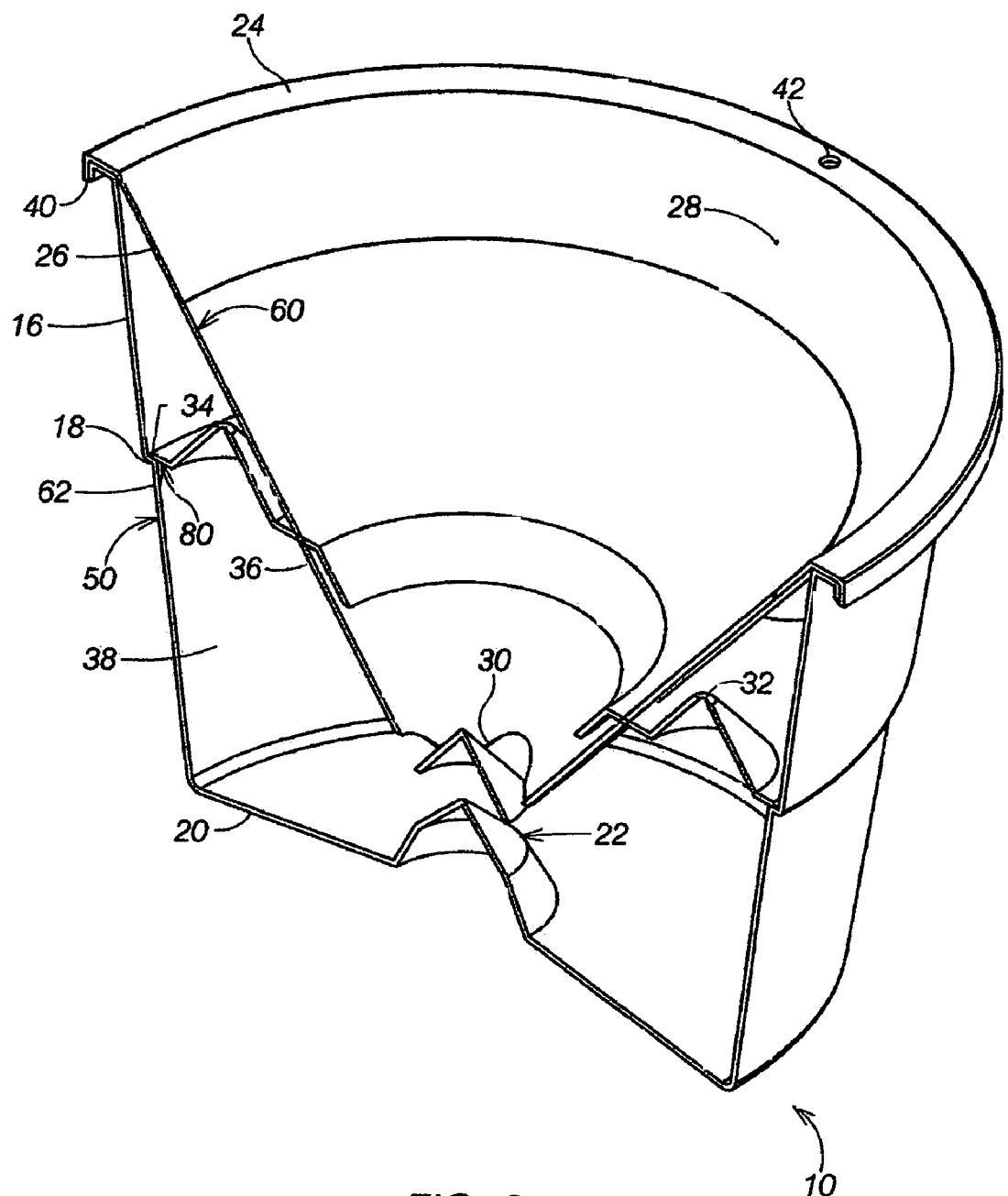
FIG. 6 is an isometric cross-sectional view of FIG. 5.

The center member 12 and associated openings 30 allow larvae to descend into the bottom container through a traditional single annular opening found in a typical funnel. Center member 12 operates to direct larvae from the funnel to the bottom container while preventing or hindering larvae from returning to the funnel once within the bottom container. As shown in FIGS. 2 and 6, center member 12 is shaped like a cone with the base portion of the cone abutting the funnel sidewall 26 and the vertex of the cone extending upward into the funnel. The cone shape directs descending larvae to the openings 30. Center member 12 operates to physically block most larvae from returning to the funnel by breaking up the traditional funnel opening into multiple smaller openings 30, decreasing the probability of a larva finding its way back up into the funnel. While center member 12 is shown and described as having a cone shape, it should be appreciated by one skilled in the art that center member 12 may be of any shape and dimension sufficient to direct larvae toward openings 30.

Openings 30 are located along the junction of center member 12 and funnel sidewall 26 to allow larvae to descend out of the funnel to the bottom surface and then to the sidewalls of the container. FIG. 2.2 shows four openings 30 evenly spaced around center member 12. Each opening can be described as having two contiguous edges. The first edge is defined by center member 12 and the second edge is defined by funnel sidewall 26. The edge of each opening 30 that is defined by funnel sidewall 26 forms a parabolic curve extending from a first junction point where center member 12 abuts funnel sidewall 26 up toward the top of the funnel and back to a second junction point of center member 12 and funnel sidewall 26 where another opening 30 begins. By distributing openings 30 evenly around center member 12 as parabolic curves, the surface area at the junction points where center member 12 abuts funnel sidewall 26 is minimized, preventing larvae from resting on the junction location and increasing the probability that the larvae will be directed through openings 30 into the bottom container. It is to be understood that openings 30 may be of any dimension, shape, number, and location around center member 12. In alternative embodiments (not shown), openings 30 are located in center member 12 rather than in funnel sidewall 26 or in both center member 12 and sidewalls 26.

The sidewall 26 and center member 12 of the funnel 60 may be constructed of various materials such as plastic or metal. However, a dark, visible light-absorbing coloring provides the most attractive location for eggs to be laid by the harmful insects, such as biting mosquitoes. A black non-horizontal top surface is especially attractive to mosquitoes. Having an opaque funnel also prevents light from entering the container near the openings 30 such that larvae are not attracted back toward the opening after the larvae have already passed through it.

One skilled in the art will appreciate that the slope of the sidewall 26 of the funnel 60 can vary. One consideration is that the openings 30 are sufficiently small so that the larvae cannot easily reenter the interior of the funnel after exiting it. The slope is also a function of the dimensions of the container, i.e., a shorter container with a wide top opening will use a different slope that a taller container with a narrow top opening. One contemplated embodiment of the funnel 60 has a top opening rim 24 having a diameter of 7.25 inches inside the rim and 8 inches outside of the rim; center member 12 having a diameter of one inch at the junction between the bottom of the funnel and center member 12, a vertical height between the top opening and the junction of the funnel with center member 12 of 4 inches, and an included angle of 77 degrees relative to horizontal to define the slope. It should be noted that these dimensions are provided only for purposes of illustration of one embodiment and that various other dimensions are also applicable. Accordingly, these dimensions are not intended to limit the scope or meaning of the claims.

While the funnel 60 provides a suitable non-horizontal top surface for the illustrated embodiment, various other non-horizontal top surfaces may also be used. For example, an inverted cone could be utilized in which the inverted cone provides a slope leading to one or more openings along the outer rim rather than providing an opening in the center, such that the larvae are directed downward and toward the outer portion of the cone and through openings at the outer portion. However, where such an inverted cone is utilized to provide a top slope, the bottom surface of the container is provided a reversed slope, which leads from the sidewall 62 downward to a center location to direct the larvae to the center of the bottom surface, which is away from the openings of the top surface. Other examples of a non-horizontal top surface include having a consistent slope leading across the diameter of the container 50 with an opening defined by the surface in proximity to the sidewall 62 or having a vertical surface extending downward but terminating above the sloped bottom surface to define an opening.

FIG. 2.1 shows the funnel bottom openings 30, center member 12, optional funnel vent holes 28, and the optional alignment holes 42 for handle insertion.

Figure 3:
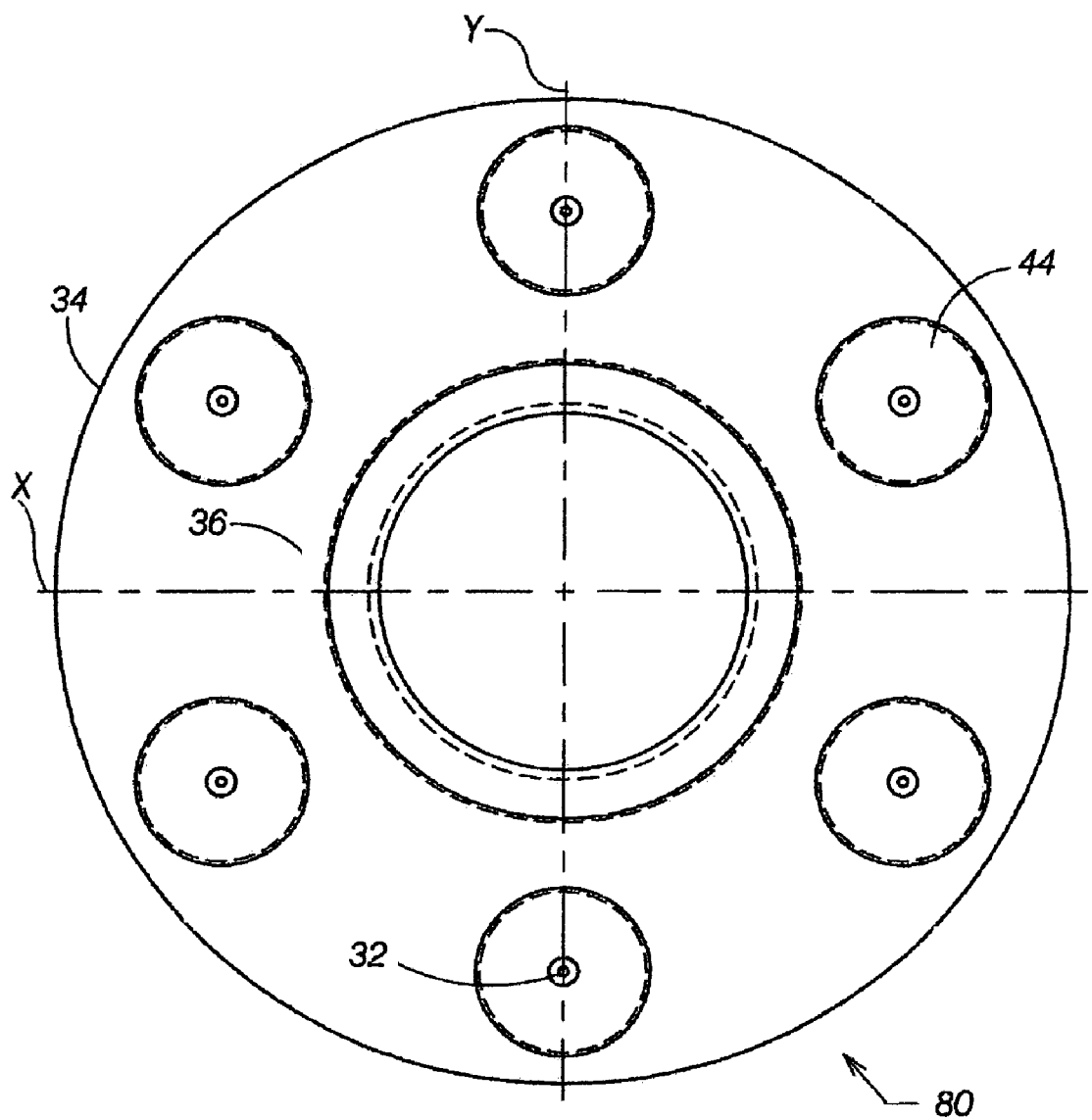
FIG. 3 is a top plan view of an illustrative ascension barrier of one embodiment.

Referring now to FIG. 3, the optional ascension barrier 80 is shown having optional inverted funnels 44, optional vent holes 32, an outer rim 34, and an ascension barrier-locking ring 36. The barrier 80 rests on the ledge 18 of the container 50 and the barrier-locking ring 36 defines a hole in the center into which the funnel 60 is received such that the openings 30 of the funnel 60 are located below the ledge 18 and ascension barrier 80. The barrier-locking ring 36 complementarily receives and contacts the underside of the funnel 60 to create a barrier between the funnel 60 and sidewall 62 of the container 50. Inverted funnels 44 are optional. Inverted funnels 44 are shown clearly in FIGS. 3.1, 6, and 7. The inverted funnels direct the larvae to the narrow end of the funnel as the larvae attempt to ascend for air, packing the larvae together to facilitate removal of larvae for testing (as discussed below) and to further hinder larvae from descending back down toward openings 30. Although six inverted funnels 44 are shown in FIG. 3 evenly spaced around barrier 80, it is to be understood that inverted funnels 44 may be of any number, size, and spacing configuration. The ascension barrier 80 may be constructed of various materials such as plastic or metal.

As noted above for the funnel 60, the vent holes 32 of the ascension barrier are optional and are not necessary when the apparatus is assembled after the liquid has already been poured into the container 50. The vent holes 32 are preferably of a dimension such that the larvae cannot easily pass through them, if at all. Alternatively, at least one of the optional vent holes 32 may be of a size sufficient to allow a larva to pass. For this larger vent hole, a plug (not shown) may be installed to prevent larvae from passing through the vent hole to the upper side of the barrier 80. The inverted funnel 44, combined with larger hole 32 and plug facilitates the removal of larvae from the container for analysis, mosquito classification, and disease detection. One would only have to remove the funnel 60 to have access to the plugged vent hole and the larvae trapped underneath. The plug may be a screen, rubber plug, cork, or any other material or means for providing temporary blockage of an opening.

FIG. 3.1 is a front view of the ascension barrier 80 showing the outer rim of ascension barrier 34 and funnel-locking ring 36. From this view, it can be appreciated that once installed, the outer rim 34 contacts the ledge 18 of the container while the funnel-locking ring 36 contacts the funnel 60 such that a barrier is created. This barrier 80 may be included in the apparatus where the liquid is filled above the barrier 80 so that larvae cannot reach the surface of the water due to the barrier and drown. Including the barrier 80 allows this mode of operation to occur without requiring that the liquid be filled all of the way to the top rim 14 of the container. However, other modes of operation will also serve to kill the harmful insects, as discussed below.

Figure 4:
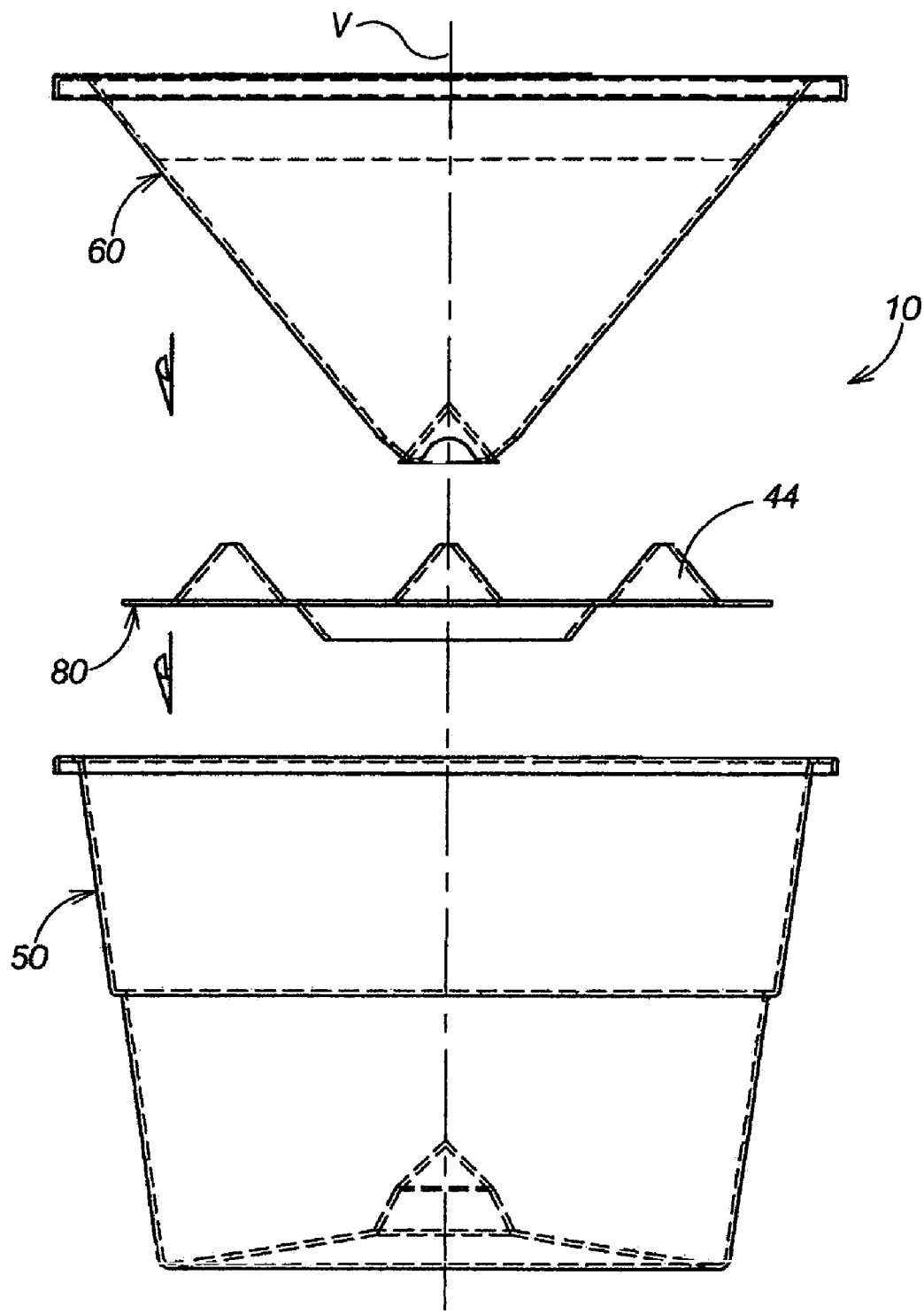
FIG. 4 is an exploded front view of one embodiment of the present invention showing the assembly process.

FIG. 4 provides an exploded view of one illustrative embodiment of the apparatus 10 of the present invention, in which the funnel 60, the optional ascension barrier 80, and the container 50 are correctly aligned for assembly. Thus, for this embodiment, the optional barrier 80 is first placed into the container 50 and is seated on the ledge 18. Then the funnel 60 is placed into the container 50 where it is seated within the locking ring 36 of the barrier 80 and fits onto the top rim 14 of the container 50.

FIG. 5 shows the assembled apparatus 10. A detailed view of a funnel-locking ring 40, which is snapped into place over the top rim 14 of the container 50, is shown in FIG. 5.1. As noted above, the funnel sidewall 26, directs the larvae in a downward direction toward and out of its openings 30, where they are further directed away from these openings by the conical structure 22 and further encouraged to move away from this area by the concave bottom 20 of the container 50. At this point, the larvae are in an entrapment chamber 38, which is defined by the bottom 20 of the container 50, sidewall 62 of the container 50, sidewall 26 of the funnel 60, the conical structure 22, and the barrier 80 if present.

Referring now to FIG. 6, the apparatus 10 is shown in cross-section, in which the funnel 60 is connected to the container 50 by the funnel-locking ring 36 at the ledge 18 of the container 50. The sidewall 26 of the funnel 60, with optional vent holes 28, slopes to the bottom openings 30 of the funnel 60 which open into the entrapment chamber 38 by passing around the conical structure 22, which is a molded part of the concave bottom 20 of this embodiment but could be a separate component installed within the container 50. Larvae attempting to get to the surface of the liquid to breathe while in the entrapment chamber 38, are blocked by the barrier 80, which is held in place below the surface of the liquid by both the ascension barrier collar 36 and ledge 18, and the larvae drown. As discussed above, inverted funnels 44 direct the larvae to congested locations, further hindering escape and facilitating larvae removal through an optional plug.

Figure 7:
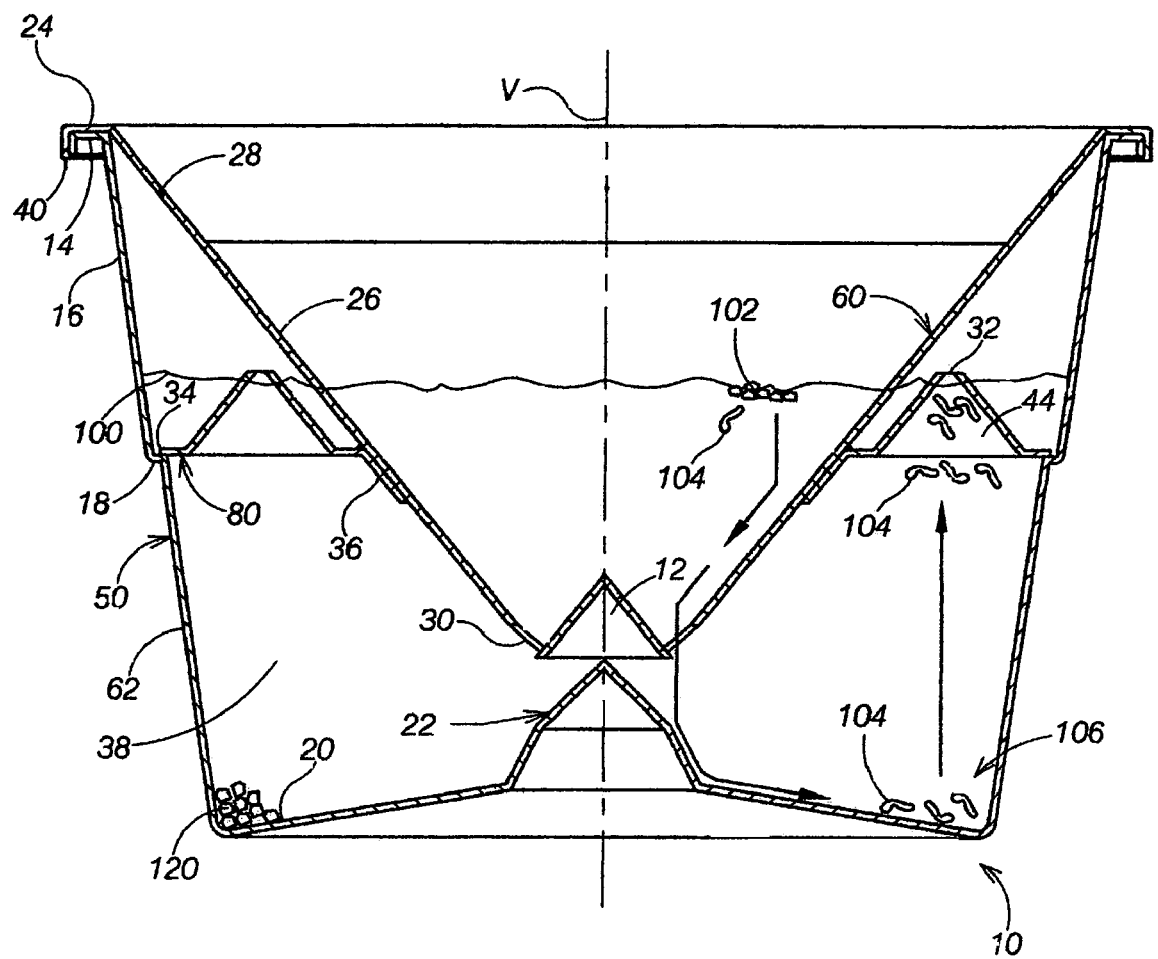
FIG. 7 is an alternative cross-sectional view of FIG. 5 after water has been placed into the container to a level adequate to drown the larvae.
Figure 8:
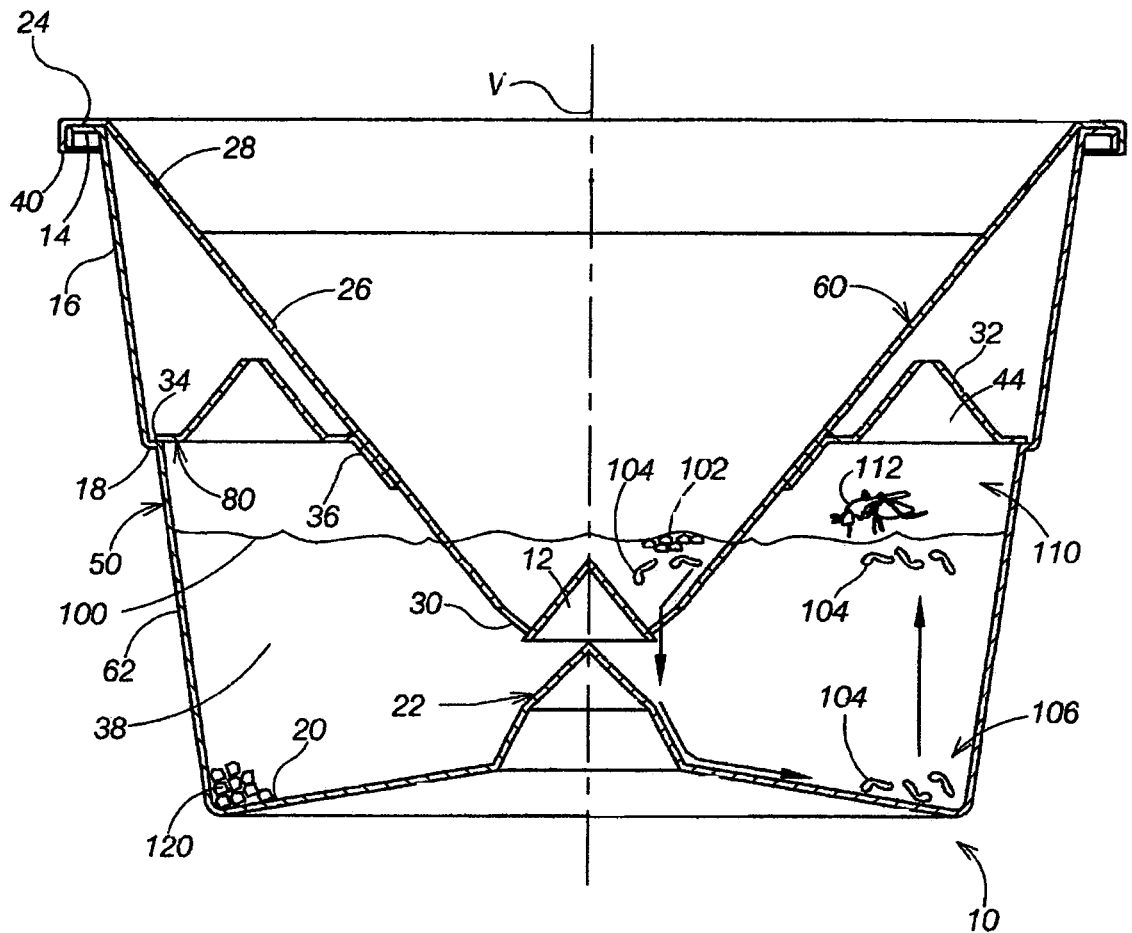
FIG. 8 is an alternative cross-sectional view of FIG. 7 after water has been placed into the container to a level adequate to trap adult mosquitoes that have developed from the trapped larvae.

In operation the assembled structure 10 is filled to a particular level with liquid. Such liquid may be water from any source, utilizing anything from a stagnant pool to fresh tap water. The water is filled to at least a level above the bottom openings 30 of the funnel 60. As discussed above, the apparatus 10 may be assembled prior to filling with water. In that case, ventilation holes in the ascension barrier 80, if the barrier 80 is present, and in the funnel 60, allow air to escape as the water displaces it. In addition to water, oviposition material 120 as shown in FIGS. 7 and 8 may be placed in the apparatus 10 to advance the stagnation of the water so as to draw mosquitoes more quickly. That is, the oviposition material depletes oxygen from the water, which also accelerates the drowning of the trapped larvae. Examples of such oviposition material include non-animal fat materials such as pot-bellied pig chow, oatmeal, alfalfa, rice hulls, and brewer's yeast. While oviposition material containing animal fat such as rabbit pellets may be used to further stagnate the water, a layer of grease may form on the water surface thereby lessening the attraction of mosquitoes to use the apparatus 10.

The apparatus 10 is placed in a location where it is likely that mosquitoes will be present to lay eggs. For example, the apparatus may be placed in a shaded area preferably in grassy locations or near bushes. As shown in FIGS. 7 and 8, mosquitoes are attracted to the still water 100 (FIG. 7), 100' (FIG. 8) present atop the funnel 60 and lay their eggs 102 within it.

The eggs 102 float on top of the water 100, 100' until they hatch into larvae 104 approximately twenty-four to forty-eight hours later. The larvae 104 breathe at the surface of the water 100, 100' instead of ingesting oxygen from the water itself, and drift or swim to the bottom to hide. The funnel sidewall 26 directs the larvae 104 down and toward the center where they emerge from the bottom openings 30 of the funnel 60, and are directed into the entrapment chamber 38, and away from the bottom openings 30 of the funnel 60 by the conical structure 22, and also by the light entering through the container 50, if translucent. Once within the entrapment chamber 38, the concave bottom 20 of the container 50 encourages further movement away from the bottom openings 30 of the funnel 60 toward an outer region 106.

As shown in FIG. 7, when the need for oxygen causes the larvae 104 to swim toward the surface of the water 100, they are blocked by the ascension barrier 80, and drown at the barrier 80 and in inverted funnels 44 since the water 100 has been filled to a level above the barrier 80. It is possible that an occasional larva 104 may find its way out of the entrapment chamber 38 and back through the bottom of the funnel 60. However, if that occurs, the process starts again by that larva 104 again swimming downwardly back in the entrapment chamber 38, where it will drown.

The method of killing the insects as shown in FIG. 7 may also work without the ascension barrier 80 present if the water 100 is filled all the way to the rim 24 of the funnel 60. Thus, once the larvae 104 enter the entrapment chamber 38 and begin to swim upward toward the surface, the larvae encounter the underside of the funnel 60 and drown.

FIG. 8 shows the water level in the apparatus 10 below the ascension barrier 80 but above the bottom openings 30 of the funnel 60. The apparatus 10 continues to work but uses a different method. In this situation, larva confined to the entrapment chamber 38 can reach the surface of the water 100' to breathe and eventually mature into adult mosquitoes 112. However, because adult mosquitoes 112 cannot swim underwater, they remain trapped in the entrapment chamber 38 and quickly die of starvation. In this scenario, the ascension barrier 80 continues to be optional because once the adult mosquito 112 develops, the underside of the funnel 60 traps the mosquito 60 if the barrier 80 is not present.

The converse of this scenario of a low water level is too much rain, which overflows the apparatus 10. Since the apparatus is designed to work at full water depths as noted above, either with or without the ascension barrier, heavy rains do no harm with the excess simply spilling over the side. Any eggs 102 or larvae 104 that spill over onto the ground with the excess water quickly die of dehydration since they must be in water to survive.

Figure 9:
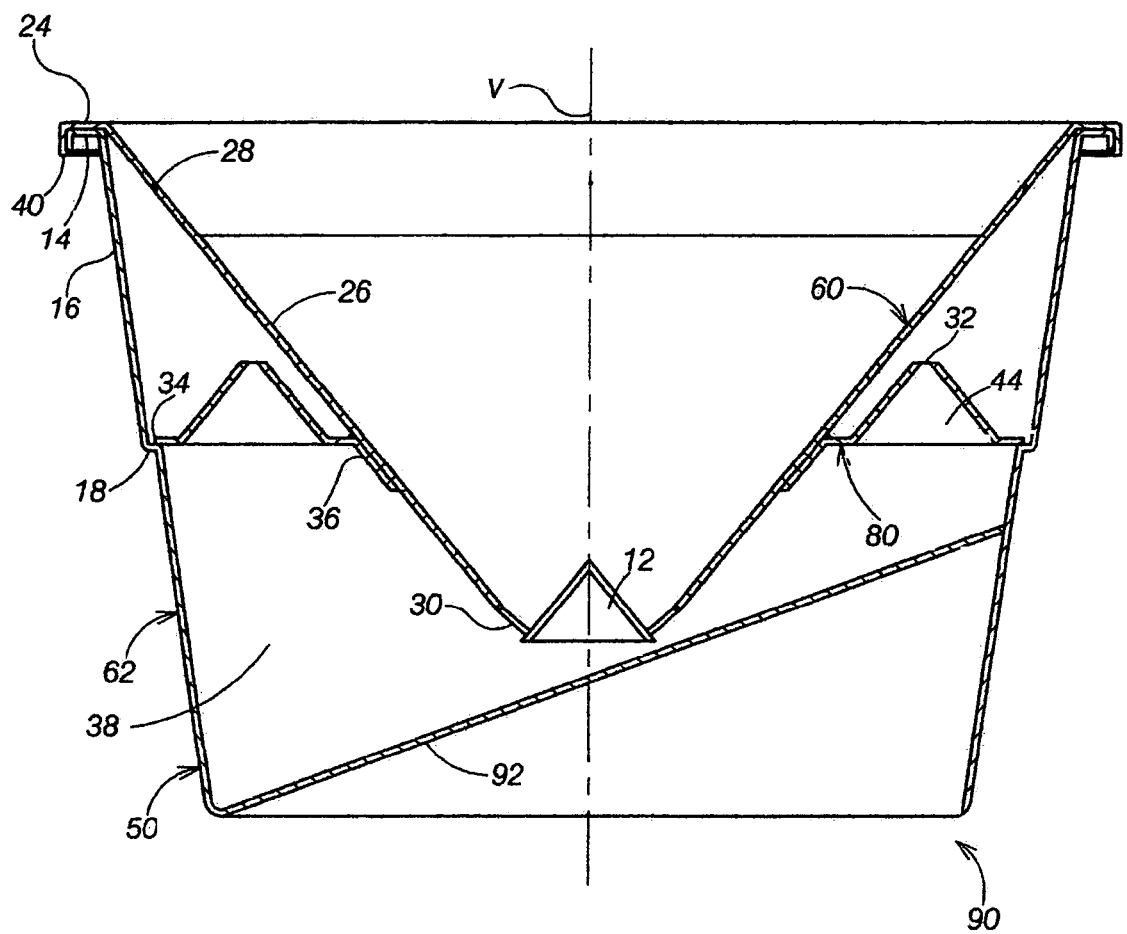
FIG. 9 is a front cross-sectional view of one assembled alternative embodiment that has a sloped bottom within the container.

FIG. 9 shows one of the various alternatives to the embodiment shown in FIGS. 1–8. The apparatus 90 of FIG. 9 includes a container 50' having a bottom 92 that forms a sloped surface relative to horizontal, as opposed to including a protrusion such as the conical structure 22 of FIGS. 1–8. The sloped surface of the bottom 92 directs the larvae toward the sidewall 62 upon the larvae passing through the openings 30 of the funnel 60. The larvae are then trapped within the entrapment chamber 38' defined by the bottom 92, sidewall 62 and funnel 60 where they drown or starve once an adult mosquito. As with the previous embodiment, the ascension barrier 80 may be included to further define the entrapment chamber 38'.

It will be appreciated that the bottom 92 of this embodiment may be substantially planar, parabolic, concave, or of other curvature that slopes away from the openings 30 and into the entrapment chamber 38'. Furthermore, it will be appreciated that the bottom 92 may also be augmented at the area below the openings 30 with a protrusion such as a conical structure as described above. Additionally, it will be appreciated that the funnel 60 may be opaque while the container 50 is translucent to further discourage the larvae from swimming toward the openings 30 while encouraging the larvae to swim toward the sidewall 62 and further into the entrapment chamber 38'.

Figure 10:
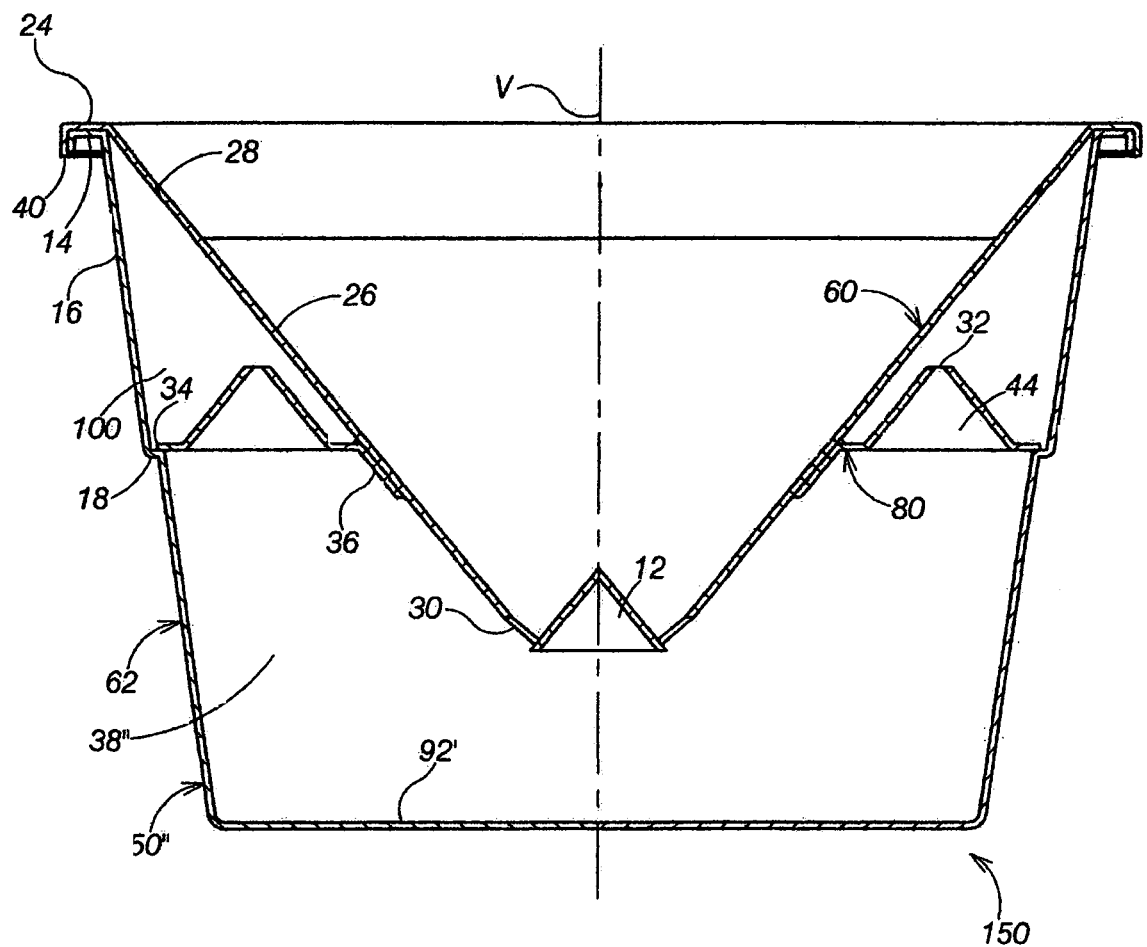
FIG. 10 is a front cross-sectional view of one assembled alternative embodiment that has a flat bottom within the container.

FIG. 10 shows another of the various alternatives to the embodiments shown in FIGS. 1–9. The apparatus 150 of FIG. 10 includes a container 50" having a bottom 92' that is flat relative to the horizontal, as opposed to forming a sloped surface relative to horizontal and as opposed to including a protrusion such as the conical structure 22 of FIGS. 1–8. The flat surface of the bottom 92' may not direct the larvae toward the sidewall 62 upon the larvae passing through the openings 30 of the funnel 60, but some larvae will swim toward the sidewall 62 without the direction from the bottom 92'. The larvae are then trapped within the entrapment chamber 38" defined by the bottom 92', sidewall 62 and funnel 60 where they drown or starve once an adult mosquito. As with the previous embodiments, the ascension barrier 80 may be included to further define the entrapment chamber 38". The level of the liquid that is used to fill the container is at least above the openings 30 but may either be above or below the ascension barrier 80.

It will be appreciated that the that the funnel 60 may be opaque while the container 50 is translucent to further discourage the larvae from swimming toward the openings 30 while encouraging the larvae to swim toward the sidewall 62 and further into the entrapment chamber 38". Thus, while the bottom 92' may not provide direction to the larvae, the light entering through the translucent container 50" will provide the effect of drawing the larvae toward the sidewall 62 and further into the entrapment chamber 38".

The exemplary apparatus and designs illustrated and discussed above in relation to FIGS. 1–10 may include several individual components. These components may be individually formed and assembled to complete the apparatus or one or more of these components may be integral with another. It will be appreciated that whether to have the components separately formed and assembled or as integral components formed together at the time of manufacture is a matter of design choice. Additionally, it should be noted that the non-horizontal directing member above the bottom 92 may be shaped in other ways. For example, the openings 30 may be defined at various locations other than near the center, such as in proximity to the sidewall 62 at a location that is near the upper intersection of the bottom 92 and the sidewall 62.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An apparatus for killing insects, comprising:
   a container having a bottom sloped relative to horizontal;
   a protrusion on the bottom of the container and having a slope relative to the bottom;
   a directing member positioned within the container above the protrusion and having at least a non-horizontal portion and a lower edge, the directing member defining an opening above the protrusion and wherein the protrusion, the directing member, and the container define a chamber;
   a conical-shaped center member secured to the lower edge of said directing member and upstanding therefrom; and
   said opening disposed at the junction of said directing member and said center member.

2. The apparatus of claim 1, wherein of a plurality of openings.

3. The apparatus of claim 1, wherein the directing member is funnel-shaped in cross-section.

4. The apparatus of claim 1, wherein the bottom of the container is concave and the protrusion is positioned on the apex of the bottom.

5. The apparatus of claim 2, wherein the protrusion has a conical shape with a vertex and a base and wherein the vertex of the conical shape is positioned under the plurality of openings when the container is upright.

6. The apparatus of claim 1, further comprising a liquid within the container, wherein the liquid fills the container to a point above the opening to thereby at least partially fill the chamber.

7. The apparatus of claim 1, further comprising a barrier located within the container abutting an underside of the directing member above its opening, wherein the chamber is further defined by the barrier.

8. The apparatus of claim 7, wherein the barrier comprises a plurality of inverted funnel extensions projecting upward from the barrier such that a narrower opening of the inverted funnel is above a wider opening of the funnel when the container is upright.

9. The apparatus of claim 7, further comprising a liquid within the container, wherein the liquid fills the container to a point above the opening and above the barrier to completely fill the chamber.

10. The apparatus of claim 1, wherein the slope of the protrusion comprises a first slope of a first portion of the protrusion and a second slope of a second portion of the protrusion, wherein the first slope is greater than the second slope, and wherein the bottom of the container has a slope that is less than the second slope of the protrusion.

11. The apparatus of claim 1, wherein the directing member is made from a dark color.

12. An apparatus for killing insects, comprising:
    a container;
    a bottom conical member having a vertex and a base located within the container, wherein the bottom conical member is positioned within the container such that the vertex is above the base when the container is upright;
    a funnel positioned within the container, the funnel defining an opening located above the vertex of the bottom conical member when the container is upright;
    a barrier having a first edge abutting the underside of the funnel and having a second edge abutting a surface of the container, wherein at least the funnel, the container, and the baffler define a chamber, said funnel comprising a center member having a conical shape.said opening being one of a plurality of openings surrounding said center member at the junction of said center member and said funnel; and said barrier comprising a plurality of inverted funnel extensions projecting upward from said barrier such that a narrower opening of the inverted funnel is above a wider opening of the funnel when said container is upright.

13. The apparatus of claim 12, further comprising water that fills the container to a level above the opening to at least partially fill the chamber, wherein the water contains oviposition material.

14. An apparatus for killing insects, comprising:
a container having a top, bottom and sidewall, wherein the bottom includes a protrusion substantially at its center;
a funnel disposed within the container and extending from the top of the container to a position adjacent the protrusion, at which point the funnel defines a plurality of openings surrounding a center conical member; a barrier disposed intermediate the sidewall of said container and said funnel so as to circumscribe the funnel, the barrier positioned above the plurality of openings of the funnel and the top of the container; and said barrier comprising a plurality of inverted funnel extensions protecting upward from the said barrier such that a narrower opening of the inverted funnel is above a wider opening of the funnel when said container is upright.

15. The apparatus of claim 14, wherein the bottom of the container is concave and the protrusion is located at its apex.

16. The apparatus of claim 14, wherein the protrusion has a top that is conical.

17. An apparatus for killing insects, comprising:
a container having a bottom sloped relative to horizontal;
a protrusion on the bottom of the container and having a slope relative to the bottom;
a directing member positioned within said container above said protrusion and having at least a non-horizontal portion, said directing member defining an opening above said protrusion and wherein the protrusion, the directing member, and the container define a chamber;
a barrier located within said container abutting above its opening, said chamber being further defined by said barrier; and
said barrier comprising a plurality of inverted funnel extensions projecting upward from said barrier such that a narrower opening of the inverted funnel is above a wide opening of the funnel when said container is upright.

* * * * *

UNITED STATES PATENT AND TRADEMARK OFFICE
CERTIFICATE OF CORRECTION

| | | |
|---|---|---|
| PATENT NO. | : 7,134,238 B2 | Page 1 of 1 |
| APPLICATION NO. | : 11/083661 | |
| DATED | : November 14, 2006 | |
| INVENTOR(S) | : James Daniel Forehand | |

It is certified that error appears in the above-identified patent and that said Letters Patent is hereby corrected as shown below:

On the title page, Item [63] change the application to : -- 10/671,947 filed on September 26, 2003, now Pat. No. 6,886,293. --

In column 1 beginning at line 7, the continuation-in-part patent application should read: -- Ser. No. 10/671,947 filed on September 26, 2003, now Pat. No. 6,886,293. --

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,134,238 B2 | Page 1 of 1 |
| APPLICATION NO. | : 11/083661 | |
| DATED | : November 14, 2006 | |
| INVENTOR(S) | : James Daniel Forehand | |

It is certified that error appears in the above-identified patent and that said Letters Patent is hereby corrected as shown below:

On the title page, Item [63] change the application to: -- Continuation-in-part of application 10/671,947 filed on September 26, 2003, now Pat. No. 6,886,293. --

In column 1 beginning at line 7, the continuation-in-part patent application should read: -- Ser. No. 10/671,947 filed on September 26, 2003, now Pat. No. 6,886,293. --

This certificate supersedes the Certificate of Correction issued February 6, 2007.

Signed and Sealed this

Twenty-second Day of September, 2009

David J. Kappos
*Director of the United States Patent and Trademark Office*